United States Patent
Jeong et al.

(10) Patent No.: US 10,928,517 B2
(45) Date of Patent: Feb. 23, 2021

(54) APPARATUS AND METHOD FOR DETECTING OBSTACLE

(71) Applicant: SOS Lab co., Ltd, Gwangju (KR)

(72) Inventors: Ji Seong Jeong, Gwangju (KR); Jun Hwan Jang, Seoul (KR); Dong Kyu Kim, Jinju-si (KR)

(73) Assignee: SOS LAB CO., LTD, Gwangju (KR)

( * ) Notice: Subject to any disclaimer, the term of this patent is extended or adjusted under 35 U.S.C. 154(b) by 511 days.

(21) Appl. No.: 15/346,466

(22) Filed: Nov. 8, 2016

(65) Prior Publication Data

US 2018/0120434 A1 May 3, 2018

(30) Foreign Application Priority Data

Oct. 27, 2016 (KR) ........................ 10-2016-0140893

(51) Int. Cl.
| | | |
|---|---|---|
| *G01S 17/89* | (2020.01) | |
| *G01S 17/08* | (2006.01) | |
| *G01S 7/481* | (2006.01) | |
| *G01S 7/497* | (2006.01) | |
| *G01S 7/48* | (2006.01) | |
| *G01S 7/4913* | (2020.01) | |
| *G01S 17/894* | (2020.01) | |
| *G01S 17/93* | (2020.01) | |

(52) U.S. Cl.
CPC ............ *G01S 17/08* (2013.01); *G01S 7/4808* (2013.01); *G01S 7/4814* (2013.01); *G01S 7/4816* (2013.01); *G01S 7/497* (2013.01); *G01S 7/4913* (2013.01); *G01S 17/894* (2020.01); *G01S 17/93* (2013.01)

(58) Field of Classification Search
None
See application file for complete search history.

(56) References Cited

U.S. PATENT DOCUMENTS

| | | | | |
|---|---|---|---|---|
| 3,516,743 A | * | 6/1970 | Tommaso | ............... G01S 17/66 356/4.01 |
| 4,119,379 A | * | 10/1978 | Zindler | .................. G01S 17/88 356/141.1 |
| 4,781,465 A | * | 11/1988 | Demachi | ............ B60G 17/0165 356/3.07 |

(Continued)

FOREIGN PATENT DOCUMENTS

| | | | | |
|---|---|---|---|---|
| DE | 19850270 A1 | * | 5/1999 | ........... G01B 11/026 |
| JP | 2000-009422 A | | 1/2000 | |

(Continued)

*Primary Examiner* — Hovhannes Baghdasaryan
(74) *Attorney, Agent, or Firm* — Novick, Kim & Lee, PLLC; Jae Youn Kim

(57) ABSTRACT

Provided are an apparatus and a method for detecting an obstacle. The apparatus includes a light-emitting unit configured to emit a plane beam by converting a laser beam into the plane beam having a rectangular shape; a light reception unit configured to receive the laser beam which is emitted from the light-emitting unit and reflected from the obstacle; and a control unit configured to measure a distance to the obstacle by using the laser beam received in the light reception unit. Thus, an obstacle is detected by using the plane beam having a rectangular shape, so that the measurement range may be enlarged upwardly and downwardly.

4 Claims, 10 Drawing Sheets

(56) References Cited

U.S. PATENT DOCUMENTS

| | | | | |
|---|---|---|---|---|
| 2003/0053041 | A1* | 3/2003 | Isogai | G01C 3/08 356/4.01 |
| 2005/0185194 | A1 | 8/2005 | Kong et al. | |
| 2006/0091286 | A1* | 5/2006 | Finizio | G01S 7/4802 250/206.1 |
| 2013/0135707 | A1* | 5/2013 | Lopez | G01S 5/16 359/291 |
| 2015/0233813 | A1 | 8/2015 | Gilbert et al. | |

FOREIGN PATENT DOCUMENTS

| | | |
|---|---|---|
| JP | 2003-156319 A | 5/2003 |
| JP | 2008-066441 A | 3/2008 |
| JP | 2009-271238 A | 11/2009 |
| KR | 10-2008-0076338 A | 8/2008 |
| KR | 101082463 B1 | 11/2011 |
| KR | 10-2012-0016322 A | 2/2012 |
| KR | 10-2012-0140176 A | 12/2012 |
| KR | 10-1296780 B1 | 8/2013 |
| KR | 10-2014-0136647 A | 12/2014 |
| KR | 10-1491289 B1 | 2/2015 |

\* cited by examiner

APPARATUS AND METHOD FOR DETECTING OBSTACLE

BACKGROUND OF THE INVENTION

1. Field of the Invention

The present invention relates to an apparatus and a method for detecting an obstacle, and more particularly, to an apparatus for detecting an obstacle which is applied to a moving subject to detect a distance between the moving subject and a circumferential obstacle and a method thereof.

2. Description of the Related Art

A laser (Light amplification by the stimulated emission of radiation) causes stimulated emission of light and amplifies the light to radiate a laser beam.

Light detection and ranging (LiDAR), which is a technique of measuring a distance by using a laser, has been developed in a form which constructs and visualizes geographical data for constructing three-dimensional geographic information system information, so that the LiDAR has been applied in construction and national defense fields.

In recent years, the LiDAR has been focused as core technology as being applied to an autonomous vehicle, a mobile robot, a drone, etc.

When applied to a vehicle, the LiDAR may measure a distance between vehicles in real time to prevent a traveling vehicle from colliding against the vehicle ahead or minimize the impact, so that the LiDAR gives a warning or performs an automatic vehicle control.

There have been disclosed techniques about an object sensing sensor for detecting an object by using laser in patent document 1 (Korean Patent Registered No. 10-1296780 issued on Aug. 14, 2013) and patent document 2 (Korean Patent Registered No. 10-1491289 issued on Feb. 6, 2015).

Patent document 1 discloses an apparatus for detecting an obstacle using a laser which includes a laser beam source for generating a laser beam, a camera for photographing a front image and a front laser beam radiation image by radiating the laser beam generated from the laser beam source, and an image processor for processing the photographed image by the camera, wherein the image processor determines that an obstacle exists when an optical point, which results from allowing a laser beam to reflect upon a subject, exists in an image obtained by subtracting one of the front image and the laser beam radiation image from the other.

Patent document 2 discloses an apparatus for sensing obstacles around a vehicle, which senses obstacles around the vehicle in a wide sensing area without a driving motor controlling a transmission angle of a laser beam, by installing at least one sensing module (light-emitting part and light reception part) at a wheel of the vehicle. The apparatus for sensing obstacles around a vehicle includes a light emitting part for emitting a laser beam, a light reception part for receiving the laser beam reflected from the obstacle after being emitted from the light-emitting part, an obstacle sensing part for sensing the obstacle using the laser beam received through the light-receiving part, and a display part for displaying the obstacle sensed by the obstacle sensing part on a screen.

Meanwhile, a laser has straightness and radiates a laser beam of a form of a dot having a narrow width.

Therefore, an apparatus for detecting an obstacle according to the related art includes a lens or prism installed on a front end of a laser to convert a dot-shaped laser into a laser having a straight-line shape to form a line beam.

However, according to the apparatus for detecting an obstacle of the related art, even though a line beam is used, since only the width of the line beam can be enlarged and the vertical width of the line beam cannot be enlarged, when the apparatus is applied to a moving subject such as a drone, the apparatus cannot exactly detect an obstacle located at an upper or low side with respect to the line beam.

Thus, there is a need to develop a technique that can detect an obstacle by converting a dot or line type of a laser beam into a plane beam having a rectangular shape to enlarge the horizontal width and vertical height of a laser beam.

SUMMARY OF THE INVENTION

To solve the problems described above, one object of the present invention is to provide an apparatus and a method for detecting an obstacle, which are capable of detecting an obstacle by using a plane beam having a rectangular shape.

Another object of the present invention is to provide an apparatus and a method for detecting an obstacle, which are capable of exactly determining a distance to an obstacle by using a signal reflected from the obstacle.

To achieve the objects described above, according to one aspect of the present invention, there is provided an apparatus for detecting an obstacle, which includes: a light-emitting unit configured to emit a plane beam by converting a laser beam into the plane beam having a rectangular shape; a light reception unit configured to receive the laser beam which is emitted from the light-emitting unit and reflected from the obstacle; and a control unit configured to measure a distance to the obstacle by using the laser beam received in the light reception unit.

According to another aspect of the present invention, there is provided a method of detecting an obstacle, which includes: (a) emitting a laser beam by converting the laser beam into a plane beam having a rectangular shape by a light-emitting unit; (b) receiving a laser beam which is emitted from the light-emitting unit and reflected from an obstacle by a light reception unit; and (c) measuring a distance to the obstacle by using the laser beam received in the light reception unit by a control unit.

As described above, according to the apparatus and method for detecting an obstacle of the present invention, since an obstacle is detected by using the plane beam having a rectangular shape, the detection range may be enlarged upwardly and downwardly.

In addition, according to the present invention, the reference data are extracted based on the maximum measured value of a measured image upon the calibration operation and the distance to an obstacle is detected based on the minimum measured value of the measured image when the obstacle is actually detected, so that the collision against the obstacle may be previously prevented from occurring, thereby improving the safety of a moving subject to which the apparatus for detecting an obstacle is applied.

In addition, according to the present invention, instead of allowing a laser diode to continuously emit a laser beam, the laser diode is controlled to periodically radiate a laser beam over a preset period in a state that the luminous intensity is increased, such that the same light quantity is maintained, thereby improving the safety.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, an apparatus and a method for detecting an obstacle according to a preferable embodiment of the present invention will be described with reference to the accompanying drawings.

In the present embodiment, a configuration of an apparatus for detecting an obstacle applied to a drone will be described.

Of course, the present invention is not limited to the above, but may be applied to various moving subjects such as a vehicle, a robot and the like, or various apparatuses such as an apparatus for detecting an object, which detects a moving object at a position.

Figure 1:
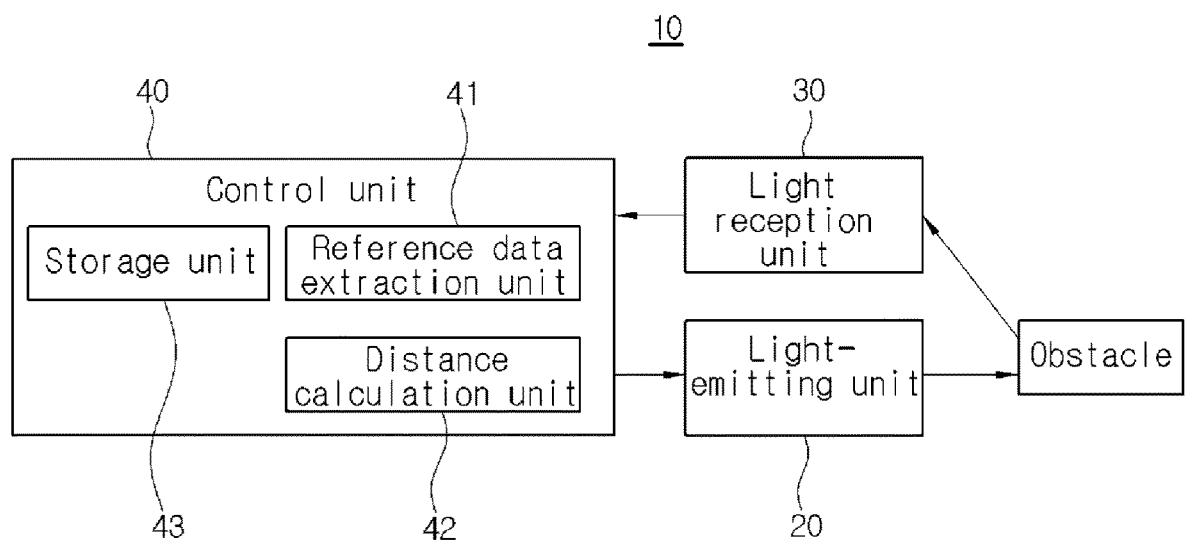
FIG. 1 is a block diagram illustrating an apparatus for detecting an obstacle according to an embodiment of the present invention.
Figure 2:
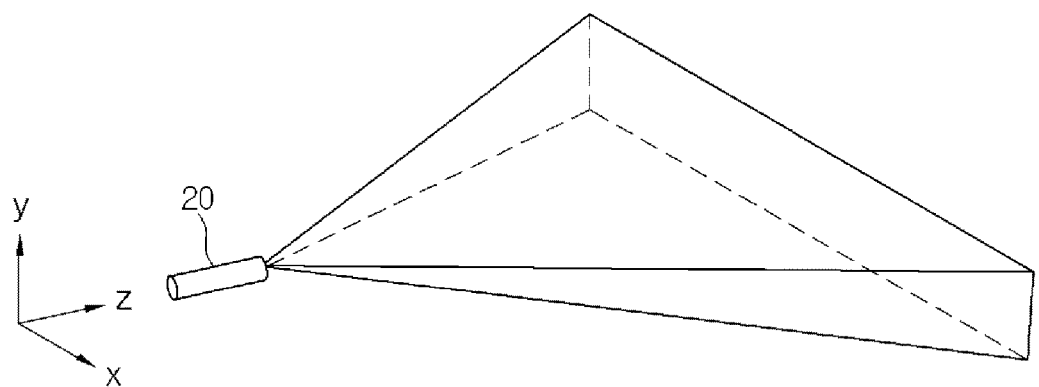
FIG. 2 is a view illustrating a laser beam emitted an light-emitting unit as depicted in FIG. 1.

FIG. 1 is a block diagram illustrating an apparatus for detecting an obstacle according to an embodiment of the present invention. FIG. 2 is a view illustrating a laser beam emitted a light-emitting unit as depicted in FIG. 1.

Hereinafter, the terms indicating directions such as left, right, forward, upward, downward and the like are defined based on the states depicted in drawings.

As shown in FIGS. 1 and 2, an apparatus 10 for detecting an obstacle according to a preferable embodiment of the present invention includes a light-emitting unit 20 for converting a laser beam into a plane beam having a rectangular shape to emit the plane beam, a light reception unit 30 for receiving a laser beam which is reflected from an obstacle after being emitted from the light-emitting unit 20, and a control unit 40 for measuring a distance to the obstacle by using the laser beam received by the light reception unit 30.

The light-emitting unit 20 may include a laser diode 21 for generating the laser beam and an optical module 22 for converting the laser beam into the plane beam having the rectangular shape.

Figure 3:
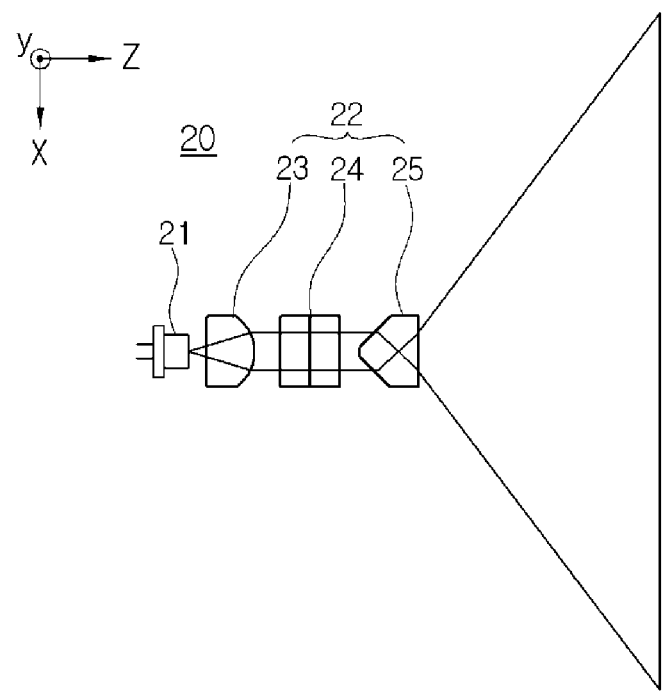
FIGS. 3 and 4 are plan and side views of the light-emitting unit.
Figure 4:
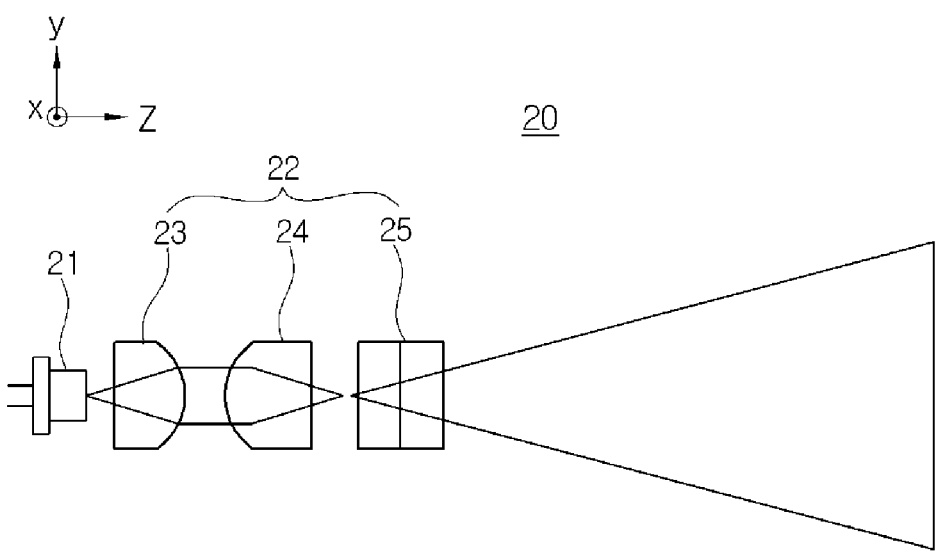

FIGS. 3 and 4 are plane and side views of the light-emitting unit.

As shown in FIGS. 3 and 4, the optical module 22 may include a first lens 23 for condensing the laser beam emitted from the laser diode 21, a second lens 24 for vertically dispersing the laser beam condensed on the first lens 23 to generate a line beam of a straight line shape, and a third lens 25 for horizontally dispersing the line beam radiated through the second lens 24 to generate a plane beam having a rectangular shape.

The first lens 23 may be prepared with a collimating lens that condenses the laser beam emitted from the laser diode 21 to allow a section of the laser beam to be dot-shaped.

The second lens 24 may be prepared with a cylindrical lens which is configured to vertically disperse the laser beam condensed in a dot shape at a first angle preset in parallel to generate the line beam of the straight-line shape.

That is, the second lens 24 dispenses the laser beam on y-z plane to generate the line beam in the state that the laser beam is focused only on y-z plane and is maintained in a dot shape on another plane, that is, x-z plane.

The third lens 25 may be prepared with a Powwll lens which is configured to horizontally disperse the line beam at a second angle in parallel to generate the plane beam of the rectangular shape.

That is, the third lens 26 may disperse the line beam on x-y plane to generate the plane beam of the rectangular shape.

Figure 5:
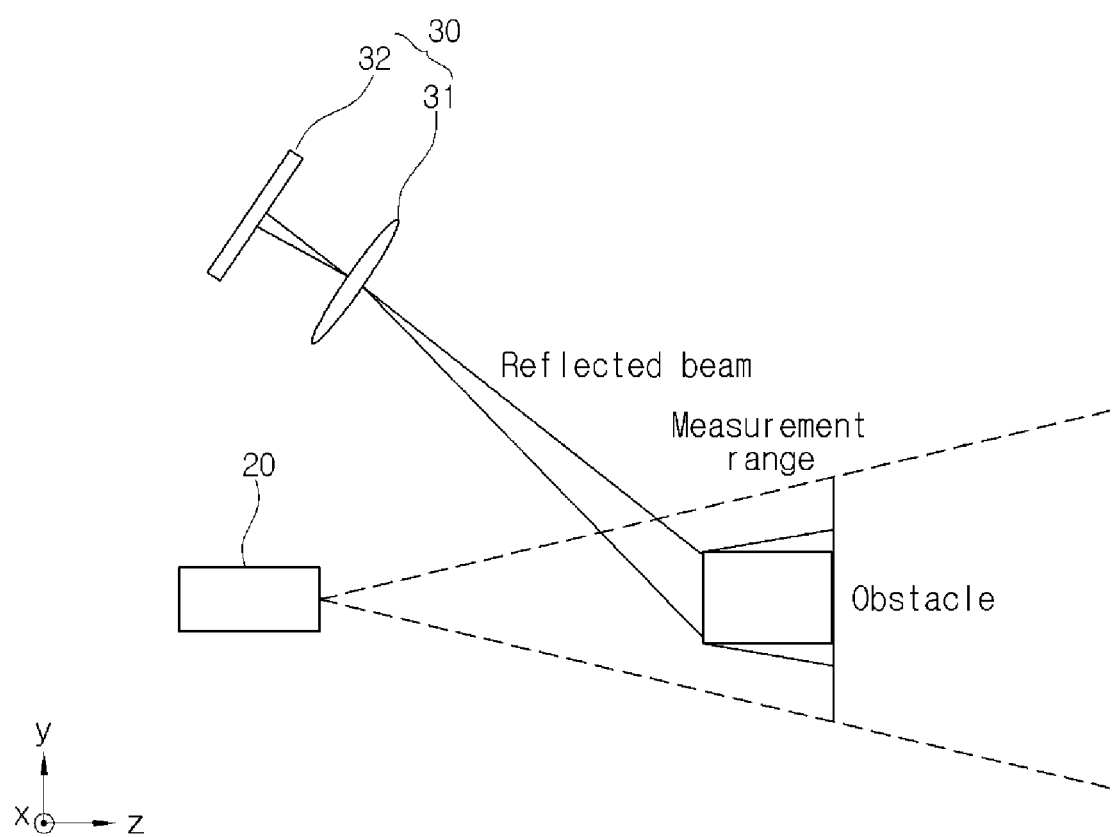
FIGS. 5 and 6 are plan and side views illustrating a plane beam radiated from the light-emitting unit toward an obstacle.
Figure 6:
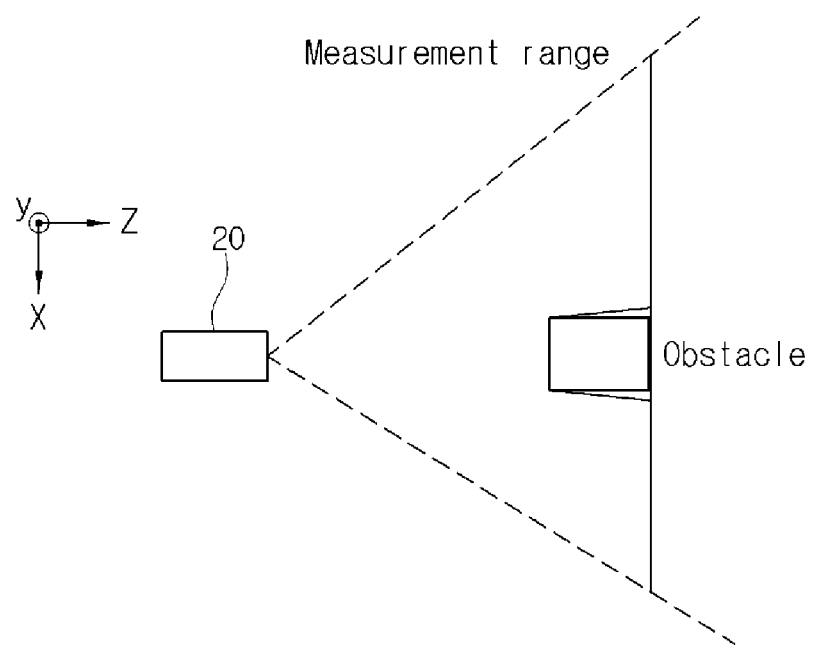

For example, FIGS. 5 and 6 are plane and side views illustrating the plane beam radiated from the light-emitting unit toward an obstacle.

As shown in FIG. 5, the first angle may be set in the range of about 5° to 30° such that the line beam is dispersed upwardly and downwardly at an angle in the range of about 2.5° to 15°.

The second angle may be set in the range of about 30° to 180° such that the plane beam is dispersed at an angle in the range of about 15° to 90° left and right with respect to the central point.

Meanwhile, although it is described in the embodiment that the first to third lenses are sequentially installed, it should be understood that the present invention may be modified by changing the positions of the second and third lenses or by applying, as well as the cylindrical lens and Powell lens, various types of lenses or prisms capable of diffusing a laser beam.

In addition, the present invention may be modified by applying a line laser in which the first and second lenses are embedded and only the third lens to radiate a plane beam having a rectangular shape.

In addition, the present invention may variously change a diffusion angle of the laser beam diffused by the second and third lens.

As shown in FIGS. 1 and 5, the light reception unit 30 is installed over the light-emitting unit 20 while being spaced apart from the light-emitting unit 20 by a preset distance, such that the light reception unit 30 receives the laser beam reflected from an obstacle and transfers the laser beam to the control unit 40.

The light reception unit 30 may include a fourth lens 31 for condensing the received laser beam and an image sensor 32 for receiving the laser beam condensed by the fourth lens 31.

Figure 7:
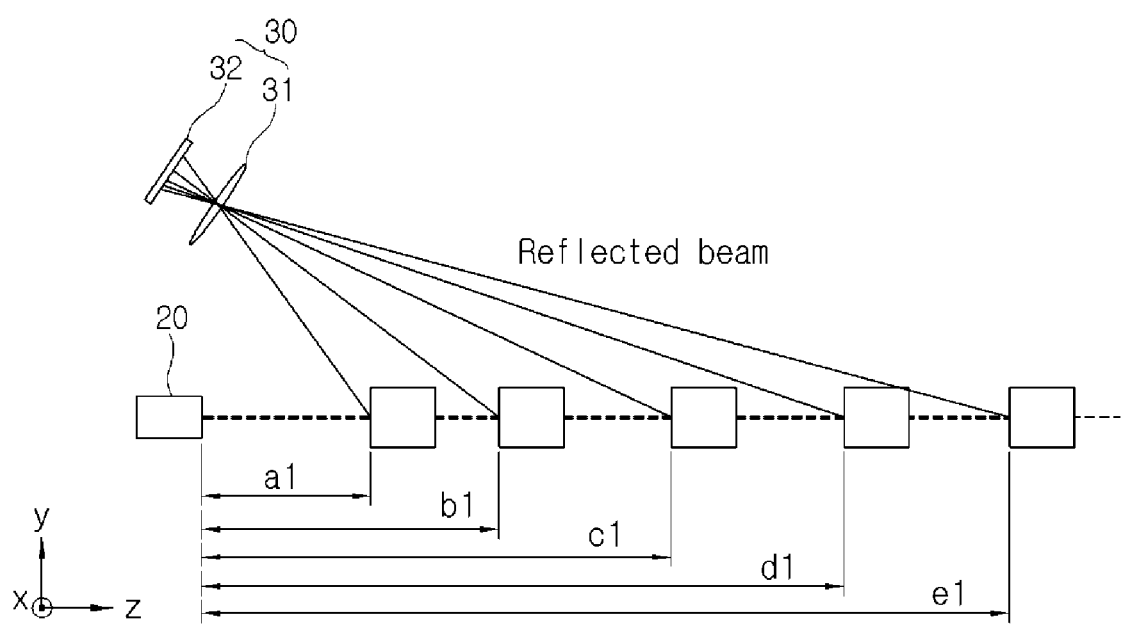
FIG. 7 is a view illustrating the configuration of an obstacle-sensing sensor to which a line beam is applied.

FIG. 7 is a view illustrating the configuration of an obstacle sensing sensor to which a line beam is applied. FIGS. 8 to 12 views illustrating measured values corresponding to laser beams received at a light reception unit shown FIG. 7.

Figure 9:
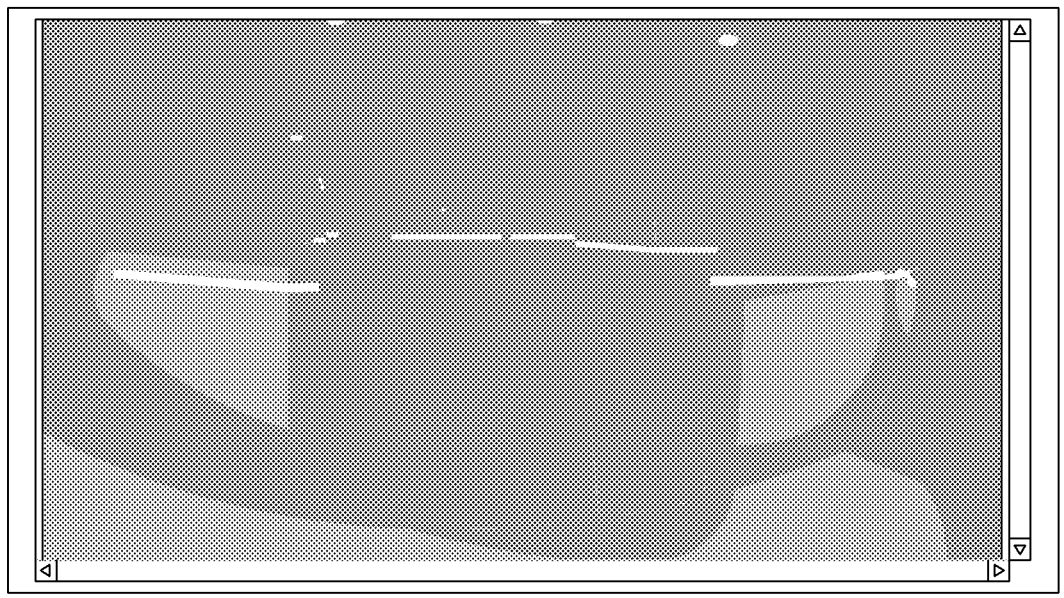
Figure 10:
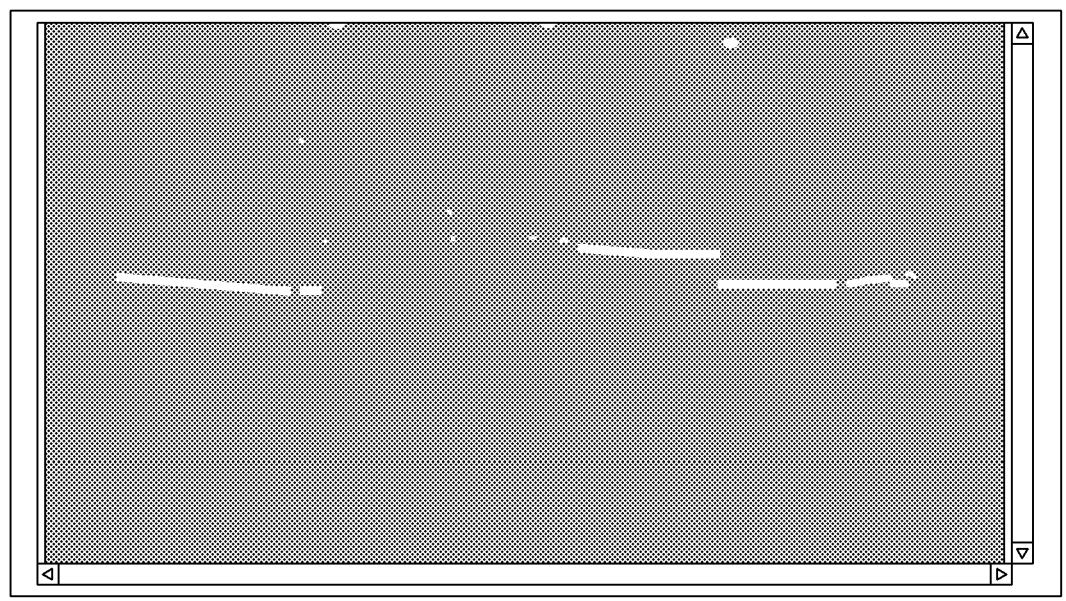
Figure 11:
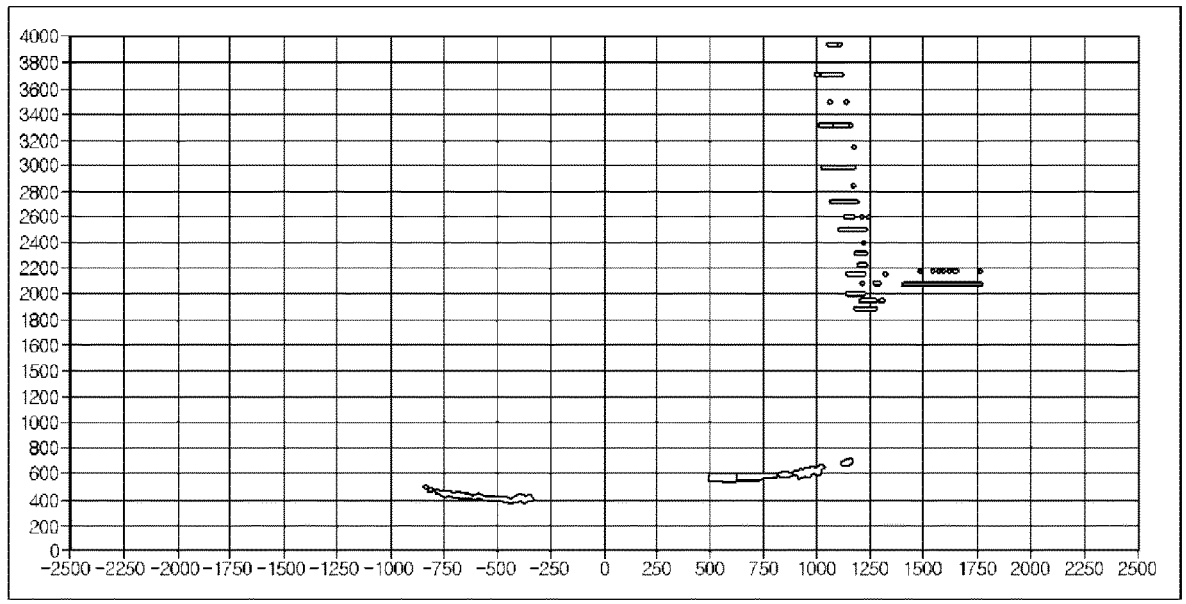
Figure 12:
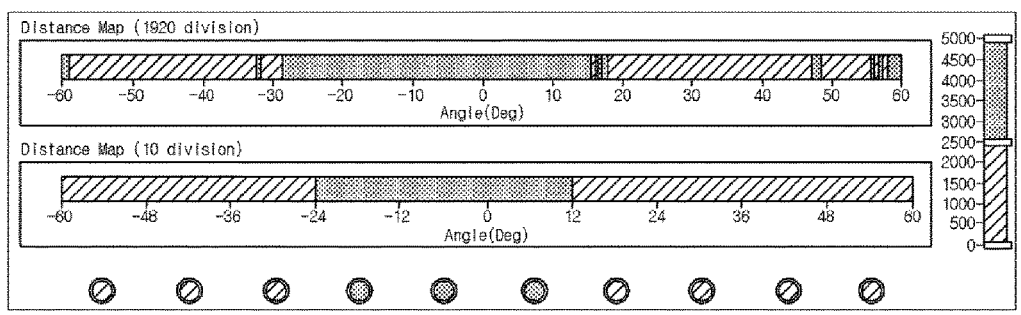

FIG. 9 shows a value measured by the image sensor in the state that an obstacle is placed at both front sides of the apparatus for detecting an obstacle in a close range. FIG. 10 shows the result of extracting a laser beam by using the value measured by the image sensor. FIG. 11 shows the result of converting the result shown in FIG. 10 into distance information. FIG. 12 shows the result of displaying whether an obstacle exists within a certain distance at each angle.

Figure 8:
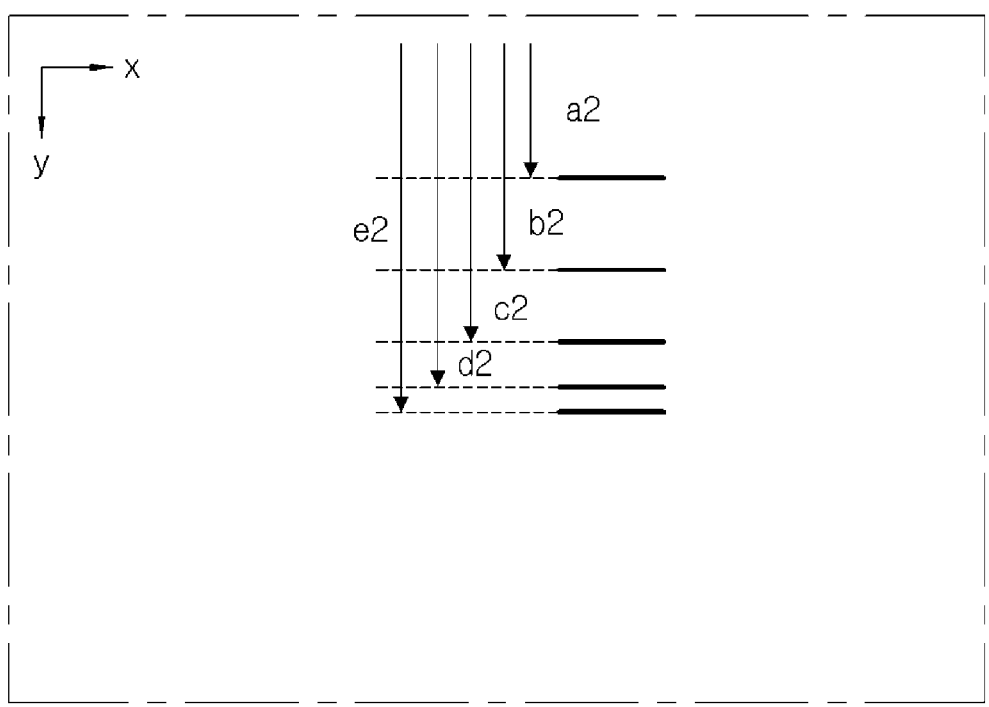
FIGS. 8 to 12 views illustrating measured values corresponding to laser beams received at a light reception unit shown FIG. 7.

In case of applying a line beam as shown in FIG. 7, it may be understood that, as the distance to the obstacle is increased from a1 to position e1, the measured value measured by the image sensor 32 in an Y-axis direction (hereinafter, referred to as 'measured value') is increase from a2 to e2 in the Y-axis direction, as shown in FIG. 8.

A width of the measured image of a line shape may be changed corresponding to a width of the obstacle in an X-axis direction.

Thus, the measured value measured by the image sensor 32 and the actual distance to the obstacle may be expressed as following Equation 1.

$$y = \frac{a}{b-x} + c \qquad \text{[Equation 1]}$$

Wherein x represents an actual distance to an obstacle, 'a', 'b' and 'c' represent variables which may be set through a calibration operation.

As described above, according to Equation 1, the measured values may be depicted as a curved shape wherein the increasing degree is gradually reduced as the actual distance to the obstacle is increased from d1 to d5.

Meanwhile, as shown in FIG. 12, as the result of an obstacle sensing operation, it may be confirmed that a section in which any obstacles do not exist is denoted as dots and the result of sensing obstacles is denoted as oblique lines corresponding to an angle (direction) of the obstacles placed at both front sides of the apparatus of detecting an obstacle.

Figure 13:
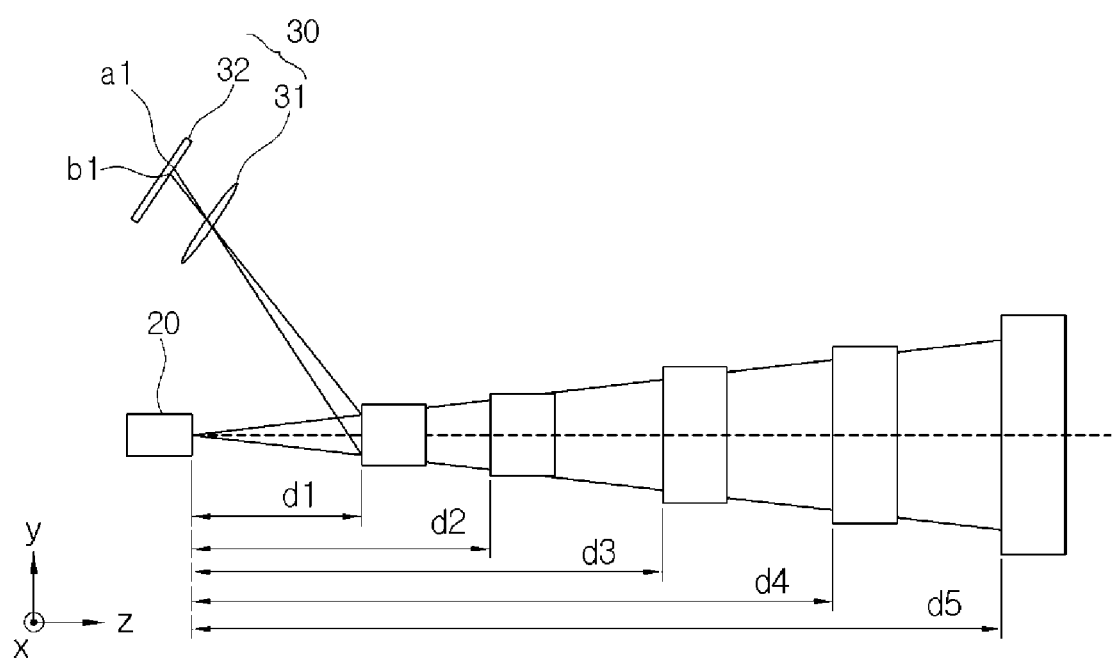
FIG. 13 is a view illustrating an operation of detecting obstacles located at mutually different distances.
Figure 14:
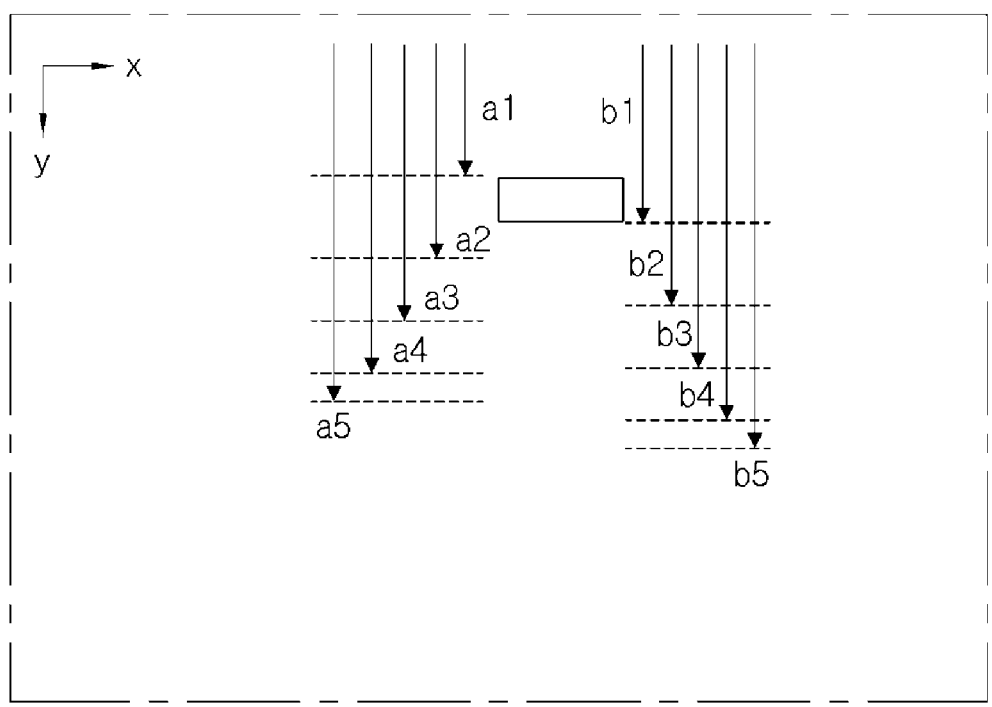
FIG. 14 is a view illustrating a measured value corresponding to a laser beam received at the light reception unit depicted in FIG. 13.

FIG. 13 is a view illustrating an operation of detecting obstacles located at mutually different distances. FIG. 14 is a view illustrating a measured value corresponding to a laser beam received at the light reception unit depicted in FIG. 13.

As shown in FIG. 13, the laser beam reflected from an obstacle is condensed through the fourth lens 31, and the image sensor 32 receives the laser beam of which the upper and low ends corresponding to the upper and low ends of the obstacle are inverted to each other while the laser beam passes through the fourth lens 32.

As shown in FIG. 14, by the image sensor 32, measured value a1 of the image sensor 32 corresponds to the distance between the light reception unit 30 and the low end of the obstacle and the measured value b1 corresponds to the distance between the light reception unit 30 and the upper end of the obstacle.

Thus, the image sensor 32 may display the distance to the obstacle by using the measured image of a rectangular shape having a height corresponding to the distances between the upper and low ends of the obstacle, that is, the difference between the measured values a1 and b1.

As shown in FIG. 1, the control unit 40 may include a reference data extraction unit 41 for extracting an equation of the measured value measured by the image sensor 32 for each distance to the obstacle through a calibration operation to store the equation in a storage unit 43 as reference data, and a distance calculation unit 42 for comparing the measured value measured by the image sensor 32 with the reference data to calculate the actual distance to the obstacle when the actual distance to the obstacle is measured.

According to the embodiment, the distance to the obstacle is measured by using the plane beam having a rectangular shape, so that there is a difference between the minimum and maximum measured values of the measured image.

Upon the calibration operation, the reference data extraction unit 41 may extract the equation based on the measured values b1 to b5 on the measured image, that is, the minimum measured value with respect to the obstacle for each distance in order to store the equation as the reference data.

Meanwhile, the distance calculation unit 42 may calculate the distance to the obstacle based on the minimum measured value, that is, the measured value a1, such that it is determined that the first obstacle exists between the measured values a1 and b1 when the actual distance to the obstacle is measured.

The control unit 40 may be prepared with a central processing unit which is provided to the apparatus 10 for detecting an obstacle to control the operation of each device.

Thus, the control unit 40 may control the laser diode 21 such that the laser diode 21 is operated to radiate a laser beam.

In this case, although the control unit 40 may control the laser diode 21 such that the laser diode 21 continuously radiates a laser beam, when the laser beam is continuously radiated, a problem may occur in safety.

So, the control unit 40 may control such that the laser beam is periodically radiated according to a preset period in consideration of safety.

As described above, the luminous intensity of the periodically radiated laser beam is increased such that the light quantity of the periodically radiated laser beam is maintained to be equal to that in case of the continuously radiated laser beam, and the radiation period of the laser beam may be set according to a pixel value of the image sensor 32.

For example, when a frame rate of the image sensor 32 is 30 fps, the period of the laser beam may be set to about 33 ms.

Next, a calibration method and a method of detecting an obstacle for an apparatus for detecting an obstacle according to a preferable embodiment of the present invention will be described with reference to FIG. 15.

Figure 15:
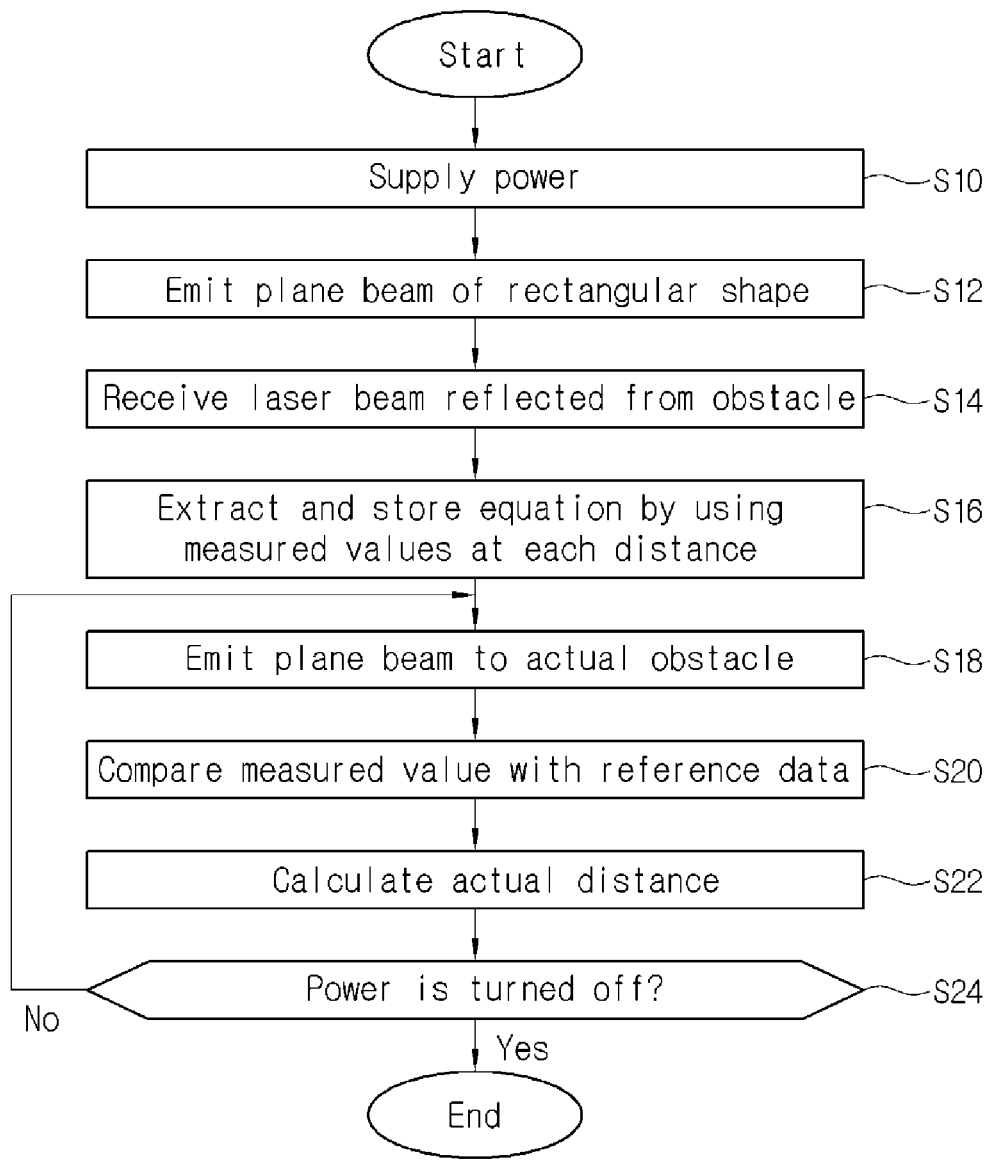
FIG. 15 is a flowchart illustrating a method of detecting an obstacle by the apparatus for detecting an obstacle according to a preferable embodiment of the present invention.

FIG. 15 is a flowchart illustrating a method of detecting an obstacle by the apparatus for detecting an obstacle according to a preferable embodiment of the present invention.

Referring to FIG. 15, in step S10, when the apparatus 10 for detecting an obstacle is powered, the control unit 40 initiates each device and prepares a calibration operation for extracting and storing reference data.

Describing the calibration method in detail, in step S12, the control unit 40 controls the light-emitting unit 20 such that the light-emitting unit 20 converts a laser beam into a plane beam having a rectangular shape to radiate the plane beam.

In this case, each obstacle may be prepared to have an area corresponding to the rectangular-shaped plane beam and may be arranged to be included in an area of the plane beam.

For example, upon the calibration operation, obstacles may be sequentially arranged in the range of about 1 m to about 5 m from the light-emitting unit 20 every 1 m.

Then, in step S14, the light reception unit 30 receives the laser beams reflected from the obstacles arranged at each preset distance and transfers the received laser beams to the control unit 40.

Thus, in step S16, the reference data extraction unit 41 extracts the equation corresponding to the relation between the measured value in the Y-direction and the actual distance to the obstacle by using the laser beam received at the light reception unit 30 according to each distance to the obstacle and stores the equation as the reference data.

In this case, the reference data are extracted based on the maximum value of the measured image, that is, values b1 to b5.

By the procedure described above, when the reference data are stored, the control unit 40 may detect the actual distance to the obstacle.

In detail, in step S18, the control unit 40 controls the light-emitting unit 20 such that the light-emitting unit 20 converts the laser beam into the plane beam having a rectangular shape to radiate the plane beam to the obstacle.

The light reception unit 30 receives the laser beam reflected from the obstacle and transfers the received laser beam to the control unit 40.

Then, in step S20, the distance calculation unit 42 compares the value measured by the image sensor 32 with the reference data.

In this case, in step S22, the distance calculation unit 42 compares the minimum measured value of the measured image with the reference data and calculates the actual distance to the obstacle by using the comparison result.

Thus, according to the present invention, instead of the actual distance to the obstacle, the distance to the obstacle is detected based on the minimum measured value measured by the image sensor.

Therefore, according to the present invention, the distance to the obstacle may be determined with the maximum approximate distance, so that the corrosion against an obstacle may be previously prevented from occurring, thereby improving the safety of a moving subject to which the apparatus for detecting an obstacle is applied.

In step S24, the control unit 40 examines whether the apparatus 10 for detecting an obstacle is powered off, and controls such that the steps of S18 to S24 are repeated until the power is turned off.

If the power is turned off in step S24 as the examination result, the control unit 40 stops the apparatus 10 for detecting an obstacle operating and the control is terminated.

Through the procedure according to the present invention described above, an obstacle is detected by using the plane beam having a rectangular shape so that the measurement range may be enlarged.

In addition, according to the present invention, the reference data are extracted based on the maximum measured value of a measured image upon the calibration operation and the distance to an obstacle is detected based on the minimum measured value of the measured image when the obstacle is actually detected, so that the collision against the obstacle may be previously prevented from occurring, thereby improving the safety of a moving subject to which the apparatus for detecting an obstacle is applied.

Although an exemplary embodiment of the present invention has been described for illustrative purposes, those skilled in the art will appreciate that various modifications, additions and substitutions are possible, without departing from the scope and spirit of the invention as disclosed in the accompanying claims.

The present invention may be applied to a technique of detecting an obstacle, which enlarges the measurement range by sensing an obstacle through a plane laser beam having a rectangular shape.

What is claimed is:

1. An apparatus for detecting an obstacle, the apparatus comprising:
   a light-emitting unit configured to emit a plane beam by converting a laser beam into the plane beam;
   a light reception unit configured to receive a reflected laser beam which is reflected from the obstacle by emitting the plane beam from the light emitting unit, wherein the received reflected laser beam forms a plurality of reception positions for the obstacle; and
   a control unit configured to measure a distance to the obstacle based on the plurality of reception positions for the obstacle,
   wherein the control unit comprises:
   a reference data extraction unit configured to extract reference distance data for at least one of the plurality of reception positions in the light reception unit; and
   a distance calculation unit configured to compare the at least one of the plurality of reception positions in the light reception unit with the reference distance data in order to calculate the distance between the apparatus and the obstacle,
   wherein the reference distance data includes a first reference distance data extracted based on a first reception position of the plurality of reception positions,
   wherein the distance calculation unit calculates a first distance data based on a second reception position of the plurality of reception positions, and
   wherein the second reception position is selected among the plurality of reception positions such that a distance value of the first distance data is less than or equal to a distance value of the first reference distance data.

2. The apparatus of claim 1, wherein the light-emitting unit comprises:
   a laser diode configured to generate the laser beam; and
   an optical module configured to convert the laser beam into the plane beam having a rectangular shape, and
   wherein the optical module comprises:
   a first lens configured to condense the laser beam emitted from the laser diode;
   a second lens configured to vertically disperse the laser beam condensed on the first lens to generate a line beam; and
   a third lens configured to horizontally disperse the line beam irradiated through the second lens to generate the plane beam having the rectangular shape.

3. The apparatus of claim 1, wherein the first reception position is defined at one edge of a plane of the received reflected laser beam, and
   the second reception position is defined at another edge of the plane of the received reflected laser beam.

4. The apparatus of claim 1, wherein the first reception position or the second reception position is selected to be the center of a plane of the received reflected laser beam.

* * * * *